United States Patent
Tsimhoni et al.

(10) Patent No.: US 11,830,514 B2
(45) Date of Patent: Nov. 28, 2023

(54) SYSTEM AND METHOD FOR AUGMENTING VEHICLE PHONE AUDIO WITH BACKGROUND SOUNDS

(71) Applicant: GM GLOBAL TECHNOLOGY OPERATIONS LLC, Detroit, MI (US)

(72) Inventors: Omer Tsimhoni, Bloomfield Hills, MI (US); Eli Tzirkel-Hancock, Raanana (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 34 days.

(21) Appl. No.: 17/332,211

(22) Filed: May 27, 2021

(65) Prior Publication Data
US 2022/0383893 A1 Dec. 1, 2022

(51) Int. Cl.
G10L 21/0364 (2013.01)
G10L 21/0356 (2013.01)
G10L 21/0264 (2013.01)
H04M 1/72454 (2021.01)
H04M 1/60 (2006.01)
G10L 21/0208 (2013.01)

(52) U.S. Cl.
CPC ...... *G10L 21/0364* (2013.01); *G10L 21/0264* (2013.01); *G10L 21/0356* (2013.01); *H04M 1/6091* (2013.01); *H04M 1/72454* (2021.01); *G10L 2021/02087* (2013.01)

(58) Field of Classification Search
CPC ............. G10L 21/0364; G10L 21/0356; G10L 21/0264
See application file for complete search history.

(56) References Cited

U.S. PATENT DOCUMENTS

| 5,001,776 A * | 3/1991 | Clark ...................... H04B 1/109 455/308 |
| 7,653,543 B1 * | 1/2010 | Blair ........................ G10L 17/26 704/271 |
| 9,699,288 B1 * | 7/2017 | Chien .................... G10L 21/003 |
| 2011/0105034 A1 * | 5/2011 | Senders ........... G10K 11/17825 455/63.1 |
| 2011/0159855 A1 * | 6/2011 | Cheng ............... H04M 1/72451 379/207.02 |
| 2011/0217957 A1 * | 9/2011 | Macdonald .......... H04M 11/066 455/414.1 |
| 2014/0200884 A1 * | 7/2014 | McArthur .............. H04R 25/00 704/206 |
| 2015/0112672 A1 * | 4/2015 | Giacobello ........... H04M 9/082 704/233 |
| 2018/0268836 A1 * | 9/2018 | Krasnov ................. G10L 21/16 |
| 2018/0286422 A1 * | 10/2018 | Liang .................. G10L 21/0364 |

(Continued)

*Primary Examiner* — Bryan S Blankenagel

(57) ABSTRACT

A vehicle infotainment system that adds background sounds to an outgoing call on a mobile device. The infotainment system comprises: i) a database of selectable augmenting audio signals; and ii) audio processing circuitry configured to receive at a first input an uplink signal from the infotainment system and receive at a second input a selected augmenting audio signal. The audio processing circuitry adapts a spectrum of the first selected augmenting audio signal to prevent the selected augmenting audio signal from masking the uplink signal and combines the adapted selected augmenting audio signal and the uplink signal to produce an augmented uplink signal at an output.

11 Claims, 4 Drawing Sheets

(56) References Cited

U.S. PATENT DOCUMENTS

| | | | |
|---|---|---|---|
| 2020/0125317 A1* | 4/2020 | Sabin | H04R 1/406 |
| 2021/0067873 A1* | 3/2021 | Winton | H04R 3/02 |
| 2021/0208841 A1* | 7/2021 | Wilberding | H04R 27/00 |
| 2022/0139388 A1* | 5/2022 | Sharifi | H04M 3/4931 |
| | | | 704/231 |
| 2023/0087486 A1* | 3/2023 | Rennies-Hochmuth | |
| | | | G10L 25/69 |
| | | | 704/200 |

* cited by examiner

SYSTEM AND METHOD FOR AUGMENTING VEHICLE PHONE AUDIO WITH BACKGROUND SOUNDS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle audio systems and, in particular, to a vehicle audio system that inserts background sounds into a mobile phone call.

Conventional vehicle infotainment systems are capable of linking to a mobile phone via a short-range transceiver (e.g., a Bluetooth transceiver) so that the phone user can operate in a "hands-free" mode. In hands-free mode, a microphone in the infotainment system picks up the voice of the user (i.e., the uplink signal) and wirelessly transmits the voice stream to the mobile phone, which transmits the uplink signal to the wireless mobile network. In hands-free mode, the infotainment system receives the downlink voice stream from the mobile phone and plays the downlink voice stream through the audio speakers of the infotainment system. Thus, the vehicle driver or another user in the vehicle can speak and listen without using his or her hands to control the mobile phone.

SUMMARY

It is an object of the present invention to provide, for use in a vehicle, an infotainment system configured to add background sounds to an outgoing call on a mobile device. The vehicle infotainment system comprises: i) a database of selectable augmenting audio signals; and audio processing circuitry. The audio processing circuitry is configured to receive at a first input an uplink signal from the infotainment system and receive at a second input a selected augmenting audio signal. The audio processing circuitry adapts a spectrum of the first selected augmenting audio signal to prevent the selected augmenting audio signal from masking the uplink signal and combines the adapted selected augmenting audio signal and the uplink signal to produce an augmented uplink signal at an output.

In one embodiment, the audio processing circuitry comprises a scale level module configured to receive the uplink signal and the selected augmenting audio signal and to produce a scaled augmenting audio signal. The scale level module scales the selected augmenting audio signal to ensure the selected augmenting audio signal is sufficiently lower than the uplink signal so that the selected augmenting audio signal does not produce a significant amount of interference.

In another embodiment, the scale level module scales the selected augmenting audio signal using a fixed criteria.

In still another embodiment, the scale level module scales the selected augmenting audio signal to ensure the selected augmenting audio signal is at least 5 dB lower than the uplink signal.

In yet another embodiment, the audio processing circuitry further comprises an adapt spectrum module configured to receive the scaled augmenting audio signal from the scale level module and to adapt the spectrum of the scaled augmenting audio signal to produce an equalized augmenting audio signal.

In a further embodiment, the audio processing circuitry further comprises a masking metric module configured to receive the uplink signal and the scaled augmenting audio signal from the scale level module, identify spectral masking locations, and generate masking metrics.

In a still further embodiment, the adapt spectrum module is further configured to receive the masking metrics from the masking metric module and to use the masking metrics to adapt the spectrum of the scaled augmenting audio signal to produce the equalized augmenting audio signal.

In a yet further embodiment, the audio processing circuitry further comprises an intelligibility metric module configured to receive the augmented uplink signal from the output and the uplink signal from the first input and to generate therefrom an intelligibility metric.

In one embodiment, the intelligibility metric module is configured to compare the uplink signal and the augmenting uplink signal and to score the intelligibility of the augmented uplink signal to produce the intelligibility metric.

In another embodiment, the audio processing circuitry further comprises an adapt level module configured to receive the equalized augmenting audio signal from the adapt spectrum module and to adapt the level of the equalized augmenting audio signal according to the intelligibility metric.

In still another embodiment, the audio processing circuitry further comprises an adder circuit configured to receive the uplink signal and to combine the uplink signal with the level-adapted, equalized augmenting audio signal from the adapt level module to produce the augmented uplink signal.

It is another object of the present invention to provide, a method in a vehicle infotainment system of adding background sounds to an outgoing call on a mobile device. The method comprises: i) selecting from a database an augmenting audio signal; ii) receiving at a first input an uplink signal from the mobile device; iii) receiving at a second input the selected augmenting audio signal; iv) adapting a spectrum of the first selected augmenting audio signal to prevent the selected augmenting audio signal from masking the uplink signal; and v) combining the adapted selected augmenting audio signal and the uplink signal to produce an augmented uplink signal at an output.

In one embodiment, the adapting the spectrum further comprises receiving in a scale level module the uplink signal and the selected augmenting audio signal and producing a scaled augmenting audio signal. The scale level module scales the selected augmenting audio signal to ensure the selected augmenting audio signal is sufficiently lower than the uplink signal so that the selected augmenting audio signal does not produce a significant amount of interference.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure describes a system and method for augmenting existing noise cancellation techniques by intentionally adding selected background sounds to an outgoing call (including voice calls and video calls) on a mobile phone or other communication device. For the purposes of this disclosure, a mobile phone is defined to include actual mobile phones and any phone device that may be embedded in a vehicle, such as an OnStar® phone in a General Motors® vehicle. The background sounds allow the driver or a passenger to express himself or herself, while also improving intelligibility and masking other sounds within the vehicle. The added background sound may cause people on the other end of the phone call to hear the driver or passenger (i.e., the user) as if the user was at a different place or situation (e.g., at the beach, a music hall, a sports arena or with background music of choice).

While existing noise cancellation techniques can remove background noises, there may be unexpected background sounds that are very difficult to predict and to remove. By intentionally adding a background sound with focus on specific frequencies, it is possible to mask entirely even these unexpected sounds. For example, the disclosed system and method may reduce the effects of a crying baby in the background by adding music that has similar frequency content.

The disclosed system and method may characterize the existing background noise and potential noise based on historical data on similar contexts and modify the generated background sounds in order to mask effectively these noises. Modification of the background noise in this manner maintains or improves intelligibility.

In some applications, the user may not hear the added background sound in the vehicle system while only the person on the receiving end of the call hears it. In some applications, the disclosed system may manipulate a phone conversation using background sound such that the person on the other end of the line may not hear the voice audio of the driver when the driver is in a high-workload driving situation (e.g., driving in bad weather or on a windy road).

The disclosed system and method may augment existing noise cancellation methods by intentionally adding selected background sounds such that the background sounds are selected by the user from a database of sounds associated with the infotainment system (or module) of the vehicle system. Additionally, the disclosed system and method may adapt the sound level based on feedback and may adapt masking based on an Intelligibility score.

Figure 1:
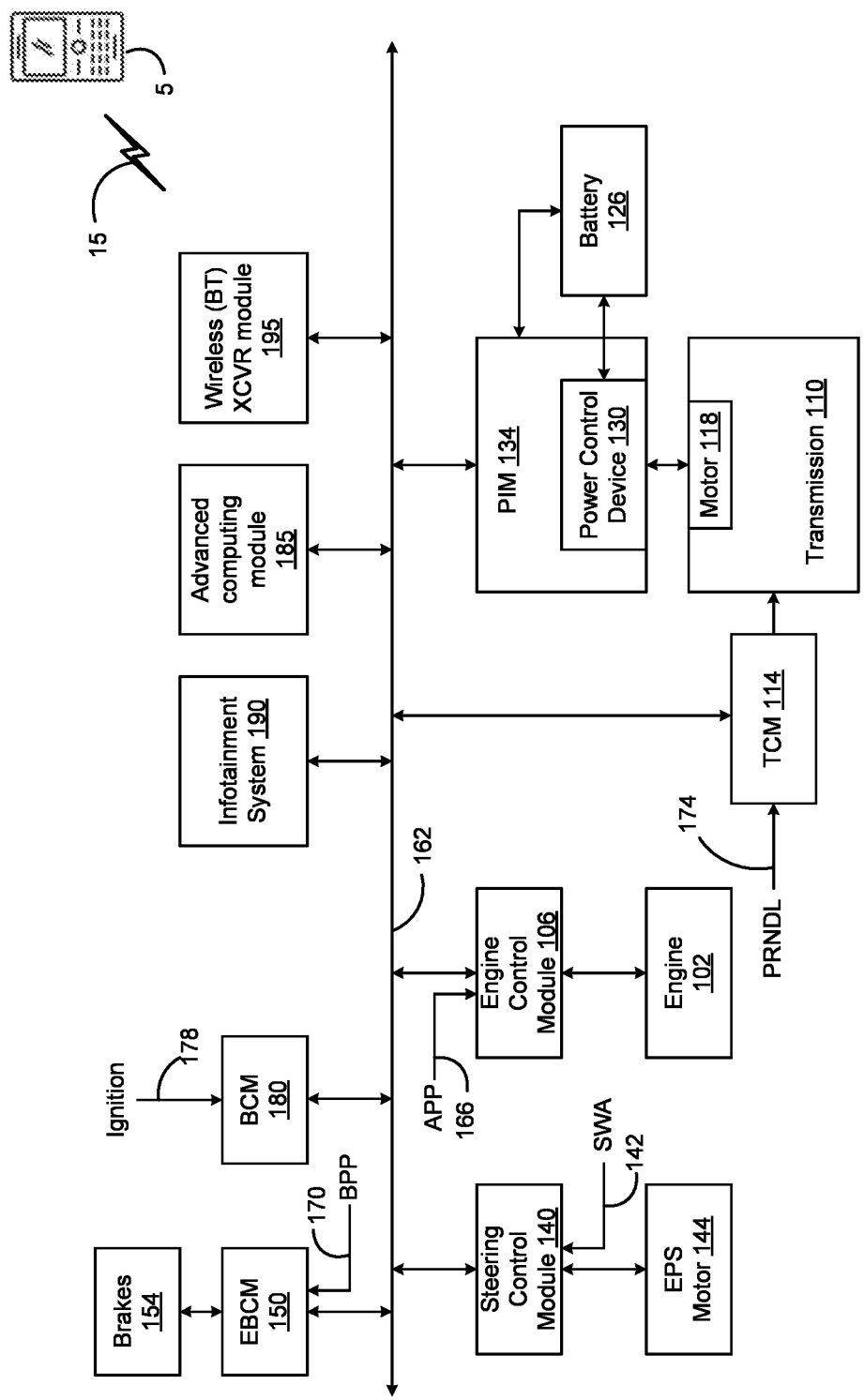
FIG. 1 illustrates an exemplary vehicle system that includes an infotainment module that augments vehicle phone audio with background sounds according to an embodiment of the present disclosure.

FIG. 1 illustrates an exemplary vehicle system 10 that includes an infotainment 190 that augments vehicle phone audio with background sounds according to an embodiment of the present disclosure. While the present disclosure shows and describes a vehicle system 10 that is a hybrid vehicle having a driver, the present disclosure is also applicable to non-hybrid vehicles incorporating only an internal combustion engine, to purely electrical vehicles (EVs), and to driverless autonomous vehicles (AVs). While the present disclosure uses a vehicle as an exemplary embodiment, the present disclosure is also applicable to non-automobile implementations, such as boats and aircraft.

An engine 102 combusts an air/fuel mixture to generate drive torque. An engine control module (ECM) 106 controls the engine 102 based on one or more driver inputs. For example, the ECM 106 may control actuation of engine actuators, such as an electronically controlled throttle valve, one or more spark plugs, one or more fuel injectors, valve actuators, camshaft phasers, an exhaust gas recirculation (EGR) valve, one or more intake airflow boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system 10 may include one or more electric motors. For example, an electric motor 118 may be implemented within the transmission 110 as shown in the example of FIG. 1. An electric motor can act either as a generator or as a motor at a given time. When acting as a generator, an electric motor converts mechanical energy into electrical energy. The electrical energy may charge a battery 126 via a power control device (PCD) 130. When acting as a motor, an electric motor generates torque that supplements or replaces torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system. An electronic brake control module (EBCM) 150 may selectively control brakes 154 of the vehicle.

Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

In vehicle system 10, an embedded microprocessor that executes program instructions in an associated embedded memory controls the operations of each of the electronic vehicle subsystems. Hereafter, the microprocessor and memory in each subsystem may be referred to generically as an electronic control unit (ECU) module. The steering control module 140, the engine control module 106, and the electronic brake control module 150 are all examples of vehicle subsystems. A dedicated embedded ECU module controls each one of these vehicle subsystems. Each ECU module in a vehicle subsystem executes a kernel program that controls the overall operation of that particular vehicle subsystem in the vehicle system 10. The critical code of the kernel is usually loaded into a separate area of memory protected from access by third party application programs and other less critical parts of the vehicle system 10.

According to an exemplary embodiment of the present disclosure, the vehicle system 10 further comprises an advanced computing module 185. The advanced computing module 185 comprises a high performance computing platform that controls many of the higher order functions and lower order functions of the vehicle systems 10. In a typical implementation, the advanced computing module 185 may be implemented as a microprocessor and an associated memory. Like the ECU modules hi the vehicle subsystems, the advanced computing module 185 also executes a kernel program that controls the overall operation of the advanced computing module 185.

According to an exemplary embodiment of the present disclosure, the vehicle system 10 further comprises an infotainment module 190 and a wireless transceiver (XCVR) module 195. In an exemplary embodiment, the wireless transceiver module 195 may comprise a Bluetooth transceiver that communicates over a wireless link 15 with a wireless device, such as a mobile phone 5, used by the driver or a passenger in the vehicle.

According to the principles of the present disclosure, when the driver or passenger operates the mobile phone 5 in hands-free mode, a microphone (not shown) in the infotainment module 190 picks up the voice of the user (i.e., the uplink signal). The infotainment module 190 then augments the voice audio stream with background audio and wirelessly transmits the augmented voice stream (augmented uplink signal) to the mobile phone 5 via the Bluetooth transceiver 195. The mobile phone 5 then transmits the augmented uplink signal to a wireless mobile network (not shown).

In hands-free mode, the infotainment module 190 also receives the downlink voice stream from the mobile phone 5 via the Bluetooth transceiver 195 and plays the downlink voice stream through the audio speakers (not shown) of the infotainment module 190. Thus, the vehicle driver or another user in the vehicle can speak and listen without using his or her hands to control the mobile phone 5.

Figure 2:
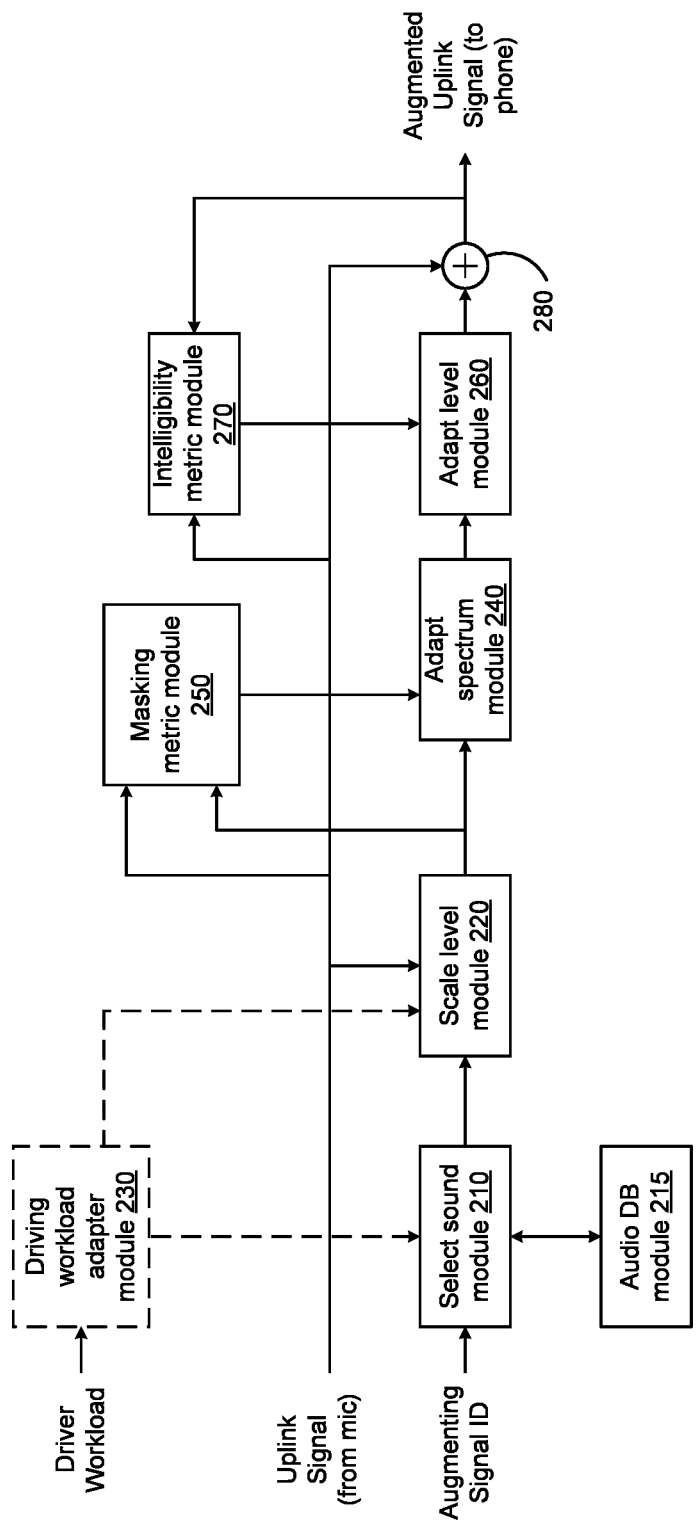
FIG. 2 illustrates the background sound augmentation system of the exemplary infotainment module according to an embodiment of the present disclosure.

FIG. 2 illustrates a background sound augmentation system of the exemplary infotainment module 190 according to an embodiment of the present disclosure. The components of the background sound augmentation system include a select sound module 210, an audio database (DB) module 215, a scale level module 220, an adapt spectrum module 240, a masking metric module 250, an adapt level module 260, an intelligibility metric module 270, and an adder circuit 280.

Optionally, the components of the background sound augmentation system of the infotainment module 190 may also include a driving workload adapter module 230 (shown in dotted lines). The background sound augmentation system receives from a microphone (not shown) of the infotainment module 190 an incoming uplink signal (e.g., a voice audio stream) and augments the incoming uplink signal with background sound according to the principles of the present disclosure. The infotainment module 190 outputs an augmented uplink signal that is transmitted to the mobile phone 5 via the Bluetooth transceiver 195.

Figure 3:
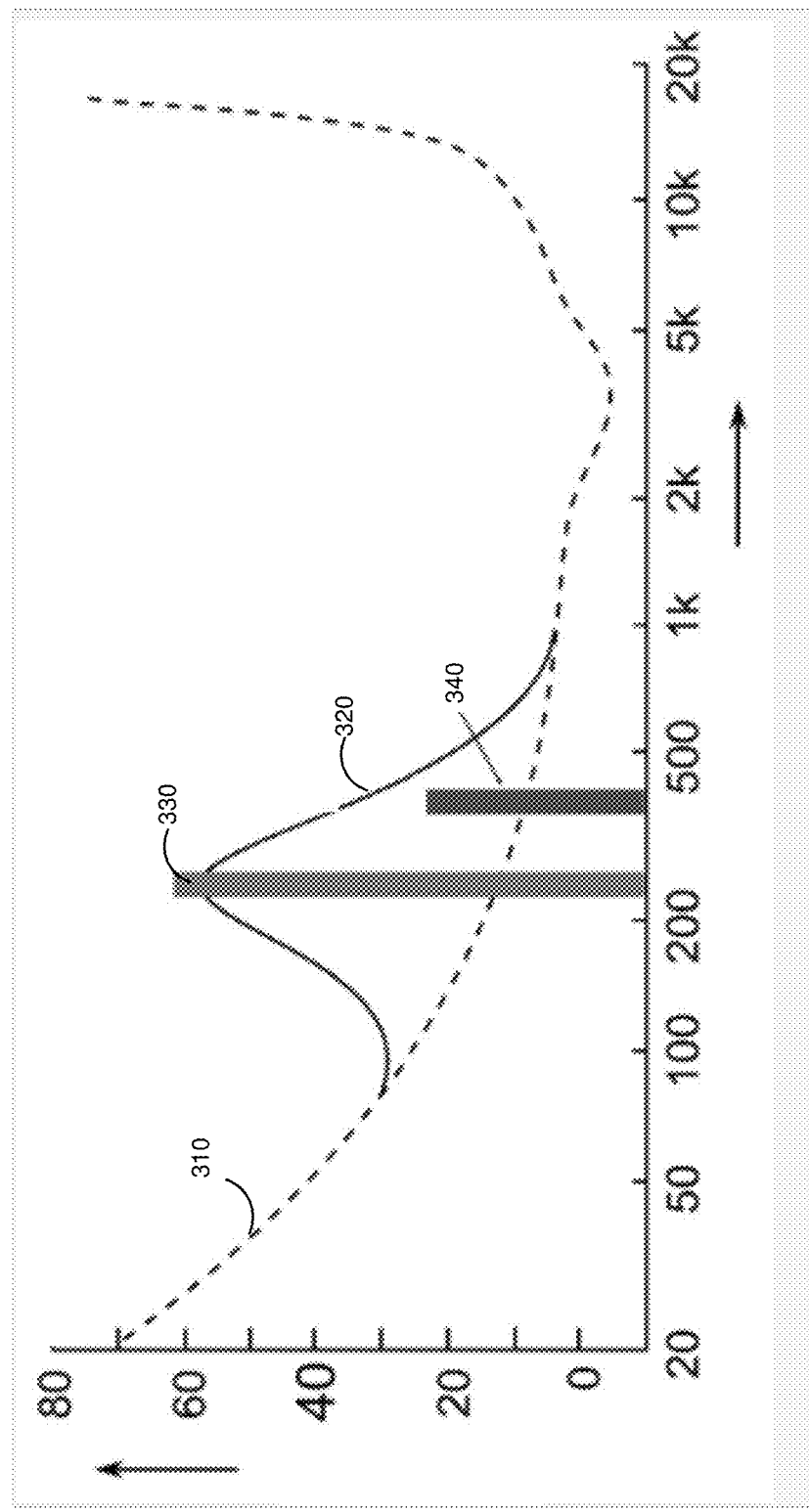
FIG. 3 is a frequency diagram of a masking envelope implemented by the background sound augmentation system of the exemplary infotainment module according to an embodiment of the present disclosure.

FIG. 3 is a frequency diagram of a masking envelope that may be detected by the exemplary infotainment module 190 according to an embodiment of the present disclosure. Dotted line 310 represents the sound energy in decibels (dB) required for human hearing. At very low frequencies and very high frequencies, increased sound energy is required to hear a sound. FIG. 3 includes an exemplary music spectral line 330 centered at approximately 250 Hz and an exemplary speech spectral line 340 centered at approximately 400 Hz.

However, the music spectral line 330 imposes a masking envelope 320 that has greater energy at 400 Hz than the speech spectral line 340. This means that the music audio will drown out the speech audio. According to the principles of the present disclosure, the background sound augmentation system ensures that the energy of the added music signal does not mask the energy of the original incoming speech signal. Thus, the disclosed background sound augmentation system implements frequency-specific equalization that reduces certain frequency bands of the musical background sounds so that the speech signal is not masked. In the example in FIG. 3, reducing the energy of the music by 10 dB in the range of 400 Hz will unmask the speech signal represented by the speech spectral line 340.

Figure 4:
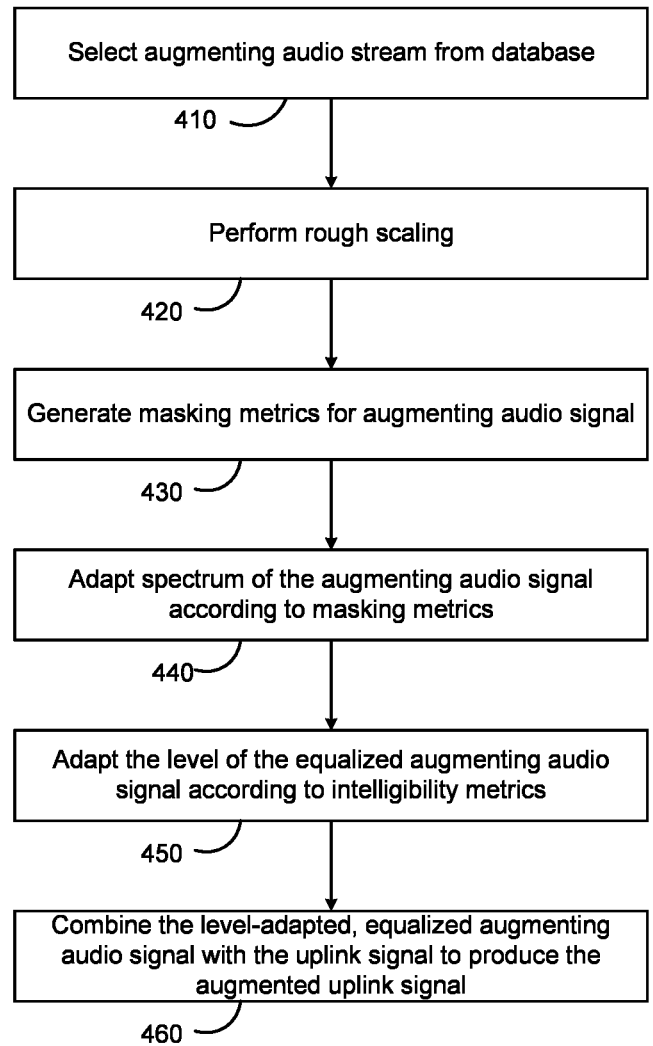
FIG. 4 is a flow diagram illustrating the operation of the background sound augmentation system according to an embodiment of the present disclosure.

FIG. 4 is a flow diagram illustrating the operation of the background sound augmentation system according to an embodiment of the present disclosure. In 410, the user selects an augmenting audio stream from the database. As shown in FIG. 2, the infotainment module 190 receives from the user an input command that selects a background sound, such as a preferred music track, a beach noise, or an entertainment venue noise. In response, the infotainment module 190 generates an augmenting signal identifier (ID). The select sound module 210 receives the augmenting signal ID and retrieves the selected background sound from the audio database module 215 in the form of a streaming audio signal.

Next, the scale level module 220 in 420 performs rough scaling. The scale level module 220 receives the uplink signal from the microphone and the streaming audio signal (or augmenting audio signal) from the audio database module 215. The scale level module 220 then compares the two input signals and uses fixed criteria to perform rough scaling of the augmenting audio signal to ensure the augmenting audio signal is sufficiently lower than the uplink signal so that the augmenting audio signal does not produce a significant amount of interference. By way of example, the scale level module 220 may ensure that the augmenting audio signal from the audio database module 215 is at least 10 dB lower than the uplink signal.

Next, the masking metric module 250 in 430 generates masking metrics for the scaled augmenting audio signal. The masking metric module 250 receives and compares the uplink signal and the scaled augmenting audio signal from the scale level module 220. The masking metric module 250 analyzes the signal energies of both signals at specific frequencies and identifies spectral masking locations and scale according to the principles described in the example shown in FIG. 3.

Next, the adapt spectrum module 240 in 440 adapts the spectrum of the scaled augmenting audio signal according to masking metrics generated by the masking metric module 250 to produce an equalized augmenting audio signal. The masking metric module 250 outputs the spectral mask locations and the signal energies to the adapt spectrum module 240, which performs frequency-specific equalization that reduces certain frequency bands of the musical background sounds so that the speech signal is not masked.

Next, the adapt level module 260 in 450 adapts the level of the equalized augmenting audio signal according to intelligibility metrics. The equalized output of the adapt spectrum module 240 is applied to the input of the adapt level module 260, which is subject to control by the intelligibility metric module 270. The adapted level output of the adapt spectrum module 240 and the uplink signal are combined by adder circuit 280 to produce the augmented uplink signal.

However, the augmented uplink signal is fed back to one input of the intelligibility metric module 270, which also receives the uplink signal as a second input. The intelligibility metric module 270 compares the uplink signal and the augmenting uplink signal and scores the intelligibility of the augmented uplink signal to produce a final scale signal that controls the adapt level module 260. If the intelligibility of the augmented uplink signal is low, the adapt level module 260 will reduce the energy of the equalized output of the adapt spectrum module 240 prior to being input to the adder circuit 280.

Finally, in 460, the adder circuit 280 combines the level-adapted, equalized augmenting audio signal with the uplink signal to produce the augmented uplink signal.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system configured to add background sounds to an outgoing call on a mobile device, the system comprising:
   a database of an infotainment system of a vehicle and including selectable augmenting audio signals; and
   audio processing circuitry of the infotainment system and configured to:
   receive at a first input an uplink signal and receive at a second input a selected augmenting audio signal;
   adapt a spectrum of the selected augmenting audio signal to prevent the selected augmenting audio signal from masking the uplink signal;
   scale the selected augmenting audio signal to be at least a predetermined number of decibels less than the uplink signal;
   combine the adapted and scaled selected augmenting audio signal and the uplink signal to produce an augmented uplink signal;
   compare the augmented uplink signal with the uplink signal;
   determine an intelligibility of the augmented uplink signal based on the comparison; and
   selectively reducing the energy of the augmented uplink signal when the intelligibility is less than a predetermined value; and
   a wireless transceiver of the vehicle and configured to transmit the selectively adjusted augmented uplink signal to the mobile device;
   the mobile device, wherein the mobile device is configured to transmit the selectively adjusted augmented uplink signal to a computing device via a wireless mobile network; and
   the computing device, wherein the computing device is configured to audibly output the selectively adjusted augmented uplink signal via a speaker.

2. The system of claim 1, wherein the audio processing circuitry is configured to scale the selected augmenting audio signal using a fixed criteria.

3. The system of claim 2, wherein the predetermined number of decibels (dB) is at least 5 dB.

4. The system of claim 1, wherein the audio processing circuitry is further configured to:
   receive the uplink signal and the scaled augmenting audio signal;
   identify spectral masking locations; and
   generate masking metrics.

5. The system of claim 4, wherein the audio processing circuitry is configured to adapt the spectrum of the scaled augmenting audio signal based on the masking metrics.

6. The system of claim 1, wherein the audio processing circuitry further comprises an adder circuit configured to combine the uplink signal with the adapted and scaled selected augmenting audio signal by adding the uplink signal with the scaled selected augmenting audio signal to produce the augmented uplink signal.

7. A method of adding background sounds to an outgoing call on a mobile device, the method comprising:
   selecting from a database of an infotainment system of a vehicle an augmenting audio signal;
   by audio processing circuitry of the vehicle, receiving at a first input an uplink signal;
   by audio processing circuitry of the vehicle, receiving at a second input the selected augmenting audio signal;
   by audio processing circuitry of the vehicle, adapting a spectrum of the selected augmenting audio signal to prevent the selected augmenting audio signal from masking the uplink signal;
   by audio processing circuitry of the vehicle, scaling the selected augmenting audio signal to be at least a predetermined number of decibels less than the uplink signal;
   by audio processing circuitry of the vehicle, combining the adapted and scaled selected augmenting audio signal and the uplink signal to produce an augmented uplink signal at an output;
   by audio processing circuitry of the vehicle, comparing the augmented uplink signal with the uplink signal;
   by audio processing circuitry of the vehicle, determining an intelligibility of the augmented uplink signal based on the comparison; and
   by audio processing circuitry of the vehicle, selectively reducing the energy of the augmented uplink signal in response to a determination that the intelligibility is less than a predetermined value; and
   by a wireless transceiver of the vehicle, transmitting the selectively adjusted augmented uplink signal to the mobile device;
   by the mobile device, transmitting the selectively adjusted augmented uplink signal to a computing device via a wireless mobile network; and
   by the computing device, audibly outputting the selectively adjusted augmented uplink signal via a speaker.

8. The method of claim 7, wherein the scaling the selected augmenting audio signal includes scaling the selected augmenting audio signal using a fixed criteria.

9. The method of claim 7, wherein the predetermined number of decibels (dB) is at least 5 dB.

10. The method of claim 7, wherein adapting the spectrum further comprises:
   identifying spectral masking locations, and generating masking metrics.

11. The method of claim 10, wherein adapting the spectrum further comprises:
   adapting the selected augmenting audio signal based on the masking metrics.

* * * * *